(12) United States Patent
Takada (10) Patent No.: US 8,256,259 B2
(45) Date of Patent: Sep. 4, 2012

(54) COIL FORMING METHOD, COIL FORMING DIE ASSEMBLY AND COIL MANUFACTURED THEREBY

(75) Inventor: Masahiro Takada, Okazaki (JP)

(73) Assignee: Denso Corporation, Kariya (JP)

( * ) Notice: Subject to any disclaimer, the term of this patent is extended or adjusted under 35 U.S.C. 154(b) by 790 days.

(21) Appl. No.: 12/341,206

(22) Filed: Dec. 22, 2008

(65) Prior Publication Data

US 2009/0158800 A1 Jun. 25, 2009

(30) Foreign Application Priority Data

Dec. 20, 2007 (JP) .................................. 2007-328647

(51) Int. Cl.
*H01F 7/06* (2006.01)
*B21D 11/10* (2006.01)
(52) U.S. Cl. ................. 72/302; 72/306; 72/362; 72/375; 29/596; 29/606
(58) Field of Classification Search .................. 72/302, 72/306, 307, 362, 375; 29/596, 606
See application file for complete search history.

(56) References Cited

U.S. PATENT DOCUMENTS

| | | | | |
|---|---|---|---|---|
| 1,721,810 | A | * | 7/1929 | Carter .............................. 72/362 |
| 4,117,707 | A | * | 10/1978 | Kolesar et al. .................. 72/306 |
| 4,922,741 | A | * | 5/1990 | Bridges et al. .................. 72/306 |
| 5,479,810 | A | * | 1/1996 | Hartmann et al. .............. 72/302 |
| 5,936,326 | A | | 8/1999 | Umeda et al. |
| 7,836,580 | B2 | * | 11/2010 | Scherrer et al. ................. 29/606 |
| 7,856,701 | B2 | * | 12/2010 | Hirota et al. .................... 29/596 |
| 2010/0251796 | A1 | * | 10/2010 | Akimoto et al. ................ 72/375 |

FOREIGN PATENT DOCUMENTS

| | | |
|---|---|---|
| JP | 53-007300 | 3/1978 |
| JP | 58-006583 | 2/1983 |
| JP | 59-039424 | 3/1984 |
| JP | 02-087531 | 7/1990 |
| JP | 08-24965 | 3/1996 |
| JP | 2634364 | 4/1997 |
| JP | 11-075334 | 3/1999 |
| JP | 11-277344 | 10/1999 |
| JP | 2000-069700 | 3/2000 |
| JP | 2001-358273 | 12/2001 |
| JP | 2003-264964 | 9/2003 |

OTHER PUBLICATIONS

Japanese Office Action dated Sep. 15, 2009, issued in corresponding Japanese Application No. 2007-328647, with English translation.

* cited by examiner

*Primary Examiner* — David B Jones
(74) *Attorney, Agent, or Firm* — Nixon & Vanderhye, PC

(57) ABSTRACT

A coil forming method, a coil forming die assembly and a coil manufactured by the coil forming method are disclosed. The coil forming method comprises conducting preliminary forming work on a coil under a linear state before conducting bending work on the coil. The preliminary forming work including conducting compression work on the coil under the linear state to compress the coil in a region covering a rounded corner portion formed when bending work is conducted to decrease a dimension of the coil in a widthwise direction. The dimension of the coil is decreased in the widthwise direction by the nearly same dimension as that of the coil bulged in the widthwise direction when bending work is conducted in the absence of the preliminary forming work. This prevents the occurrence of bulging of the coil during bending work with an increase in lamination factor.

7 Claims, 7 Drawing Sheets

COIL FORMING METHOD, COIL FORMING DIE ASSEMBLY AND COIL MANUFACTURED THEREBY

CROSS REFERENCE TO RELATED APPLICATIONS

This application is based on Japanese Patent Application No. 2007-328647, filed on Dec. 20, 2007, the content of which is hereby incorporated by reference.

BACKGROUND OF THE INVENTION

1. Technical Field of the Invention

The present invention relates to coil forming methods and coil forming die assemblies and, more particularly, to a coil forming method of conducting preliminary forming work on a coil made of a conductive raw material with an outer circumference covered with a film, and subsequently conducting bending work on the coil, subjected to the preliminary forming work, to form a rounded corner portion and a coil forming die assembly to be sued for carrying out such a coil forming method.

2. Description of the Related Art

Figure 10A:
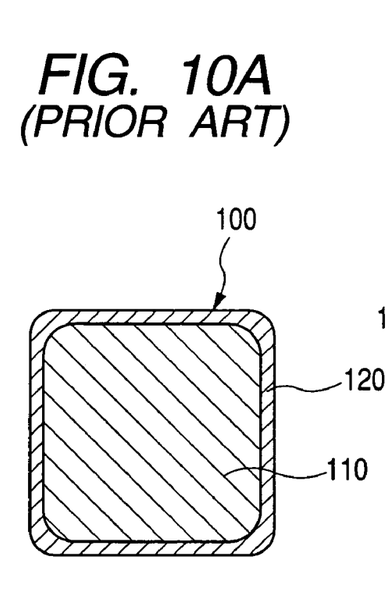
FIG. 10A is a cross-sectional view showing a coil prior to bending work being conducted in a coil forming method of one related art.
Figure 10B:
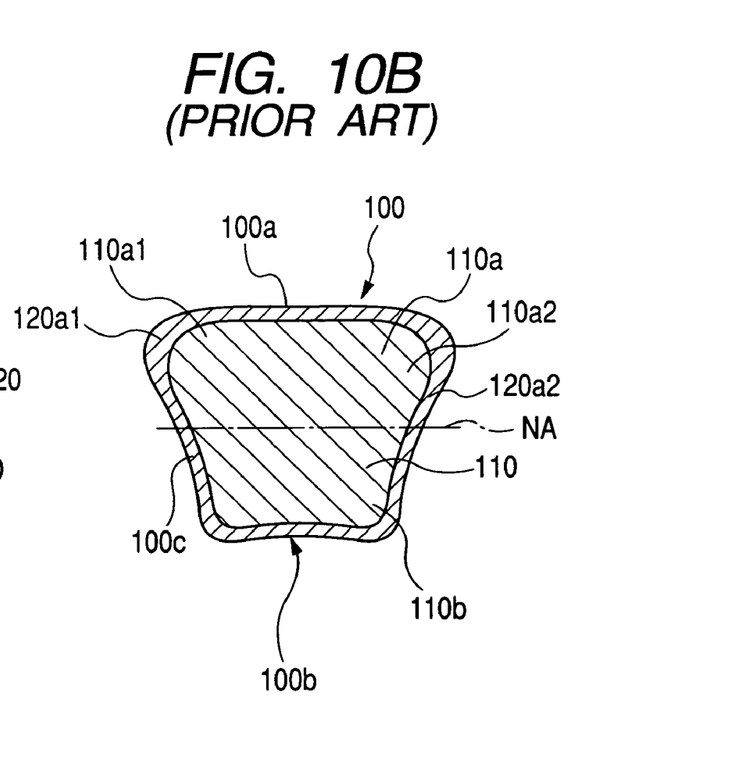
FIG. 10B is a cross-sectional view of the coil subjected to bending work conducted in the coil forming method of the related art.

In the related art, it has been a general practice to employ a coil, having a rectangular shape in cross section and covered with a film, to be used in a stator or a rotor of an electric rotary machine (see FIG. 10A). When bending work is conducted on the coil 100 at an angle of, for instance, 90 degrees with a rounded corner portion being formed at a bent area, a deformation occurs in a conductive raw material 110 of the coil 100 in an inner root area of the rounded corner portion. When this takes place, an inner body portion 110, facing inward of the coil at the rounded corner portion, has both end portions bulged in a widthwise direction of the coil due to compression strain born in the conductive raw material 110 as shown in FIG. 10B. In this case, an inside circumferential wall 100a of the rounded corner portion is inwardly convexed and an outside circumferential wall of the rounded corner portion is inwardly concaved with sidewalls 100c being inwardly concaved. Especially, bulged portions 110a and 110b of the inner circumferential body portion 110a interfere with adjacent bulged portions of neighboring coil (not shown), causing a reduction in lamination factor. To address such an issue, the bulged portions 110a1 and 110a2 of the inner body portion 110a of the coil 100 are compressed in the widthwise direction. This causes a film 120 to be distorted at areas 120a1 and 120a2 covering the bulged portions 110a1 and 110a2 (at corner areas) of the conductive raw material 110, respectively, to be thinned in thickness, resulting in an issue with the occurrence of a defect in an electrically insulating effect with the adjacent coil. In addition, due to stretching strain caused in the conductive raw material 110, the outer body portion 110b, placed outward of a neutral axis NA (representing a position at which compression strain and stretching strain are zeroed), has the film 120 with a decreased thickness. Thus, a need arises to minimize a reduction in thickness of the film.

Figure 11:
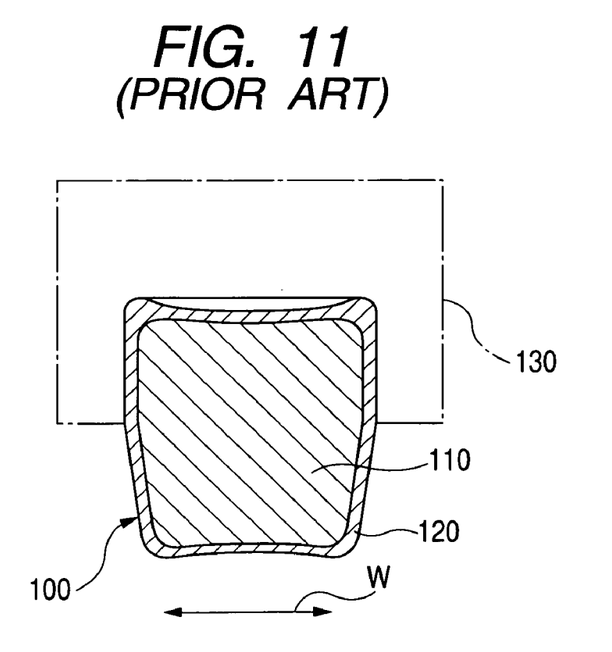
FIG. 11 is a cross-sectional view showing a coil formed by a coil forming method of the other related art.

To address such an issue, an attempt has been made to conduct bending work on the coil 100 with both sides thereof restricted with a die frame 130 or the like in a manner as shown in FIG. 11 (as disclosed in Japanese Patent no. 3894004).

With the prior art method conducting bending work on the coil 100 with the both sides being restricted with the die frame 130, stress remains in an internal part of the conductive raw material 110 after bending work being conducted. Due to an effect of such internal stress, the coil 100 expands (restores in elastic formation) at areas restricted with the die frame during bending work, resulting in a difficulty of diminishing the bulged portions 110a1 and 110a2 of the inner body portion 110a at the inner root area of the rounded corner portion. Further, with the prior art method described above, it is hard to minimize the reduction in thickness of the film 120 of the coil 100 at the outer body portion 110b thereof.

Furthermore, since bending work is conducted with the both sides of the coil 100 being restricted with the die frame 130, there is a risk that damage will be caused to the film 120 of the coil 100.

With bending work conducted on the coil 100, the outside circumferential wall 100b of the coil 100 at the rounded corner portion thereof has a central area formed in an inwardly concaved shape curved in a saddle-like configuration. Meanwhile, the inside circumferential wall 100a of the coil 100 at the rounded corner portion thereof has both sides lowered in height with a central area bulged to form a convexed shape. With such deformation of the coil 100 in shape, the inner body portion 110a of the coil 100 has the bulged portions 110a1 and 110a2. Thus, the coil 100, deformed in such a structure, has an interference with the adjacent coil, causing an issue to arise with the occurrence of a drop in lamination factor.

SUMMARY OF THE INVENTION

The present invention has been completed with a view to addressing the above issues and has an object to provide a coil forming method and a coil forming die assembly that enable bending work to be conducted on a coil without decreasing a film thickness and preventing drop in lamination factor caused by deformation of the coil in shape.

To achieve the above object, one aspect of the present invention provides a method of forming a coil, the method comprising: preparing the coil made of a conductive raw material formed in a rectangular shape in cross section and having an outer circumference covered with a film; conducting preliminary forming work on the coil under a linear state thereof; and conducting bending work on the coil after the preliminary forming work is conducted thereon for forming a rounded corner portion on the coil during the bending work. The preliminary forming work includes conducting compression work on the coil under the linear state to compress the coil in a region covering the rounded corner portion to be formed when the bending work is conducted to decrease a dimension of the coil in a widthwise direction perpendicular to a direction in which the bending work is performed. During the compression work, the dimension of the coil is decreased in the widthwise direction by nearly the same dimension as that of the coil bulged in the widthwise direction when the bending work is conducted on the coil in the absence of the preliminary forming work.

With the method according to the one aspect of the present invention, the coil is subjected to bending work under a condition in which the coil is preliminarily compressed in dimension in the widthwise direction. This prevents the conductive raw material from bulging (especially at the inside body portion of the conductive raw material at a rounded corner portion of the coil) during bending work. As a result, no remarkable change occurs in shape of the conductive raw material, enabling the coil to maintain the rectangular cross-sectional shape with the suppression in drop in lamination factor.

Further, no need arises for correcting (compressing) bulged portions formed on the inside body portion of the conductive raw material at the rounded corner portion of the coil after the completion of bending work as required in the related art. Thus, no risk takes place for the film of the coil to be distorted into a thinned thickness due to stress caused in compression work, thereby ensuring the coil can to have an electrically insulating effect from an adjacent coil.

According to another aspect of the present invention, there is provided a method of forming a coil, the method comprising: preparing the coil made of a conductive raw material formed in a rectangular shape in cross section and having an outer circumference covered with a film, in which the coil has a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film; conducting preliminary forming work on the coil under a linear state thereof at a region covering an area corresponding to the rounded corner portion to be formed when the bending work is conducted; and conducting bending work on the coil after the preliminary forming work is conducted thereon for forming a rounded corner portion on the coil. The preliminary forming work includes causing both sides of the inside body portion and both sides of the first portion of the film in the widthwise direction, perpendicular to a direction in which the bending work is performed, to be transferred to an area away from the neutral axis of the coil.

When conducting bending work on the coil with no preliminary forming work being initiated, stretching deformation occurs on both sidewalls of the inside body portion, in the widthwise direction of the coil, causing a reduction in thickness of the outside circumferential wall of the coil placed outward of the neutral axis at the rounded corner portion of the coil. Meanwhile, another stretching deformation occurs on the inside body portion, placed inward of the neutral axis at the rounded corner portion of the coil, and both sidewalls of the inside body portion placed inward of the neutral axis, resulting in an increase in thickness of the film at the inside body portion of the coil. Preliminary forming is conducted to transfer the film covered on the inside body portion, placed inward of the neutral axis, and the neighboring conductive raw material to the film on the outside body portion, placed outward of the neutral axis, and the outside body portion. Thereafter, bending work is conducted on the coil. This enables the suppression of a reduction in thickness of the film covered on the outside body portion placed outward of the neutral axis (on both sidewalls of the outside body portion at the rounded corner portion of the coil).

With the coil forming method of another aspect of the present invention, either two of the methods of forming the coil may be preferably executed in combination.

In this case, the reduction in film thickness can be minimized to a further extent than that achieved when employing any one of the coil forming methods in a single way, thereby achieving an increased lamination factor.

According to another aspect of the present invention, there is provided a coil forming die assembly for carrying out the method of forming the coil according to any one of the first to sixth aspects of the present invention. The coil forming die assembly may preferably comprise a pair of sidewall members operative to restrict both sides of the coil in the widthwise direction during the bending work of the coil, and means for increasing a space between the pair of sidewall members in the widthwise direction of the coil.

If the sidewall members for restricting the coil in the widthwise direction thereof are of stationary types, there is a risk of causing both sidewalk of the coil to bite the sidewall members with the resultant occurrence of damage to the film when taking the coil out of the die assembly.

In contrast, with the provision of the sidewall members arranged in an expandable structure to increase a space in a widthwise direction of the coil, the coil can be taken out of the die assembly to prevent the biting of the coil by increasing a space between the pair of sidewall members. Thus, the coil can be easily taken out of the die assembly without causing any damage to the coil.

According to another aspect of the present invention, there is provided a coil forming die assembly for carrying out the method of forming the coil according to any one of the first to sixth aspects of the present invention. The coil forming die assembly may preferably have surfaces, used for performing the bending work on the coil, which have surface materials formed of material having lower hardness than that of a material used for the sidewall members.

If bending work is conducted on the coil with the film of the coil being kept in direct contact with surfaces of the die assembly, the film of the coil is brought into contact with the surfaces of the die assembly in a localized area. This causes the film of the coil to bear increased surface pressures, resulting in the occurrence of a risk of causing damage to the film.

With the provision of the surface materials on the surfaces of the die assembly, on the contrary, the film of the coil can be prevented from being brought into direct contact with the surfaces of the die assembly. That is, bending work can be conducted on the coil with the film of the coil held in contact with the surface materials with lower hardness than that of material used form the die assembly. This results in a capability of preventing the occurrence of damage to the film during bending work.

With the coil forming die assembly of another aspect of the present invention, the pair of sidewall members may preferably have surfaces, used for performing the bending work on the coil, which have surface materials formed of material having lower hardness than that of a material used for the sidewall members.

If bending work is conducted on the coil with the film of the coil being kept in direct contact with surfaces of the die assembly, the film of the coil is brought into contact with the surfaces of the die assembly in a localized area. This causes the film of the coil to bear increased surface pressures, resulting in the occurrence of a risk of causing damage to the film.

With the provision of the surface materials on the surfaces of the die assembly, on the contrary, the film of the coil can be prevented from being brought into direct contact with the surfaces of the die assembly. That is, bending work can be conducted on the coil with the film of the coil held in contact with the surface materials with lower hardness than that of material used form the die assembly. This results in a capability of preventing the occurrence of damage to the film during bending work.

With a further aspect of the present invention, the coil forming die assembly for carrying out the method of forming the coil according to any one of the first to sixth aspects of the present invention, the coil forming die assembly may preferably have surfaces, used for performing the bending work on the coil, which have surface materials formed of material having lower elastic coefficient than mat of a material used for the sidewall members.

If bending work is conducted on the coil with the film of the coil being kept in direct contact with surfaces of the die assembly, the film of the coil is brought into contact with the surfaces of the die assembly in a localized area. This causes the film of the coil to bear increased surface pressures, resulting in the occurrence of a risk of causing damage to the film.

With the provision of the surface materials on the surfaces of the die assembly, on the contrary, the film of the coil can be prevented from being brought into direct contact with the surfaces of the die assembly. That is, bending work can be conducted on the coil with the film of the coil held in contact with the surface materials with lower elastic coefficient than that of material used form the die assembly. This results in a capability of preventing the occurrence of damage to the film during bending work.

With a further aspect of the present invention, the pair of sidewall members may preferably have surfaces, used for performing the bending work on the coil, which have surface materials formed of material having lower elastic coefficient than that of a material used for the sidewall members.

If bending work is conducted on the coil with the film of the coil being kept in direct contact with surfaces of the die assembly, the film of the coil is brought into contact with the surfaces of the die assembly in a localized area. This causes the film of the coil to bear increased surface pressures, resulting in the occurrence of a risk of causing damage to the film.

With the provision of the surface materials on the surfaces of the die assembly, on the contrary, the film of the coil can be prevented from being brought into direct contact with the surfaces of the die assembly. That is, bending work can be conducted on the coil with the film of the coil held in contact with the surface materials with lower elastic coefficient than mat of material used form the die assembly. This results in a capability of preventing the occurrence of damage to the film during bending work.

With a still further aspect of the present invention directed to the coil forming die assembly for carrying out the method of forming the coil according to any one of the first to sixth aspects of the present invention, the coil forming die assembly may preferably have surfaces, used for performing the bending work on the coil, which are subjected to surface treatments each providing a low friction coefficient.

If bending work is conducted on the coil with the film of the coil being kept in direct contact with surfaces of the die assembly, the film of the coil is brought into contact with the surfaces of the die assembly in a localized area. This causes the film of the coil to bear increased surface pressures, resulting in the occurrence of a risk of causing damage to the film.

With the provision of the surface materials on the surfaces of the die assembly, on the contrary, the film of the coil can be prevented from being brought into direct contact with the surfaces of the die assembly. That is, bending work can be conducted on the coil with the film of the coil held in contact with the surface materials with lower friction coefficient than that of material used form the die assembly. This results in a capability of preventing the occurrence of damage to the film during bending work.

With a still further aspect of the present invention directed to the coil forming die assembly for carrying out the method of forming the coil of the seventh aspect of the present invention, the pair of sidewall members may preferably may preferably have surfaces, used for performing the bending work on the coil, which are subjected to surface treatments each providing a low friction coefficient.

If bending work is conducted on the coil with the film of the coil being kept in direct contact with surfaces of the die assembly, there is a risk of the occurrence of causing the film to be damaged due to a friction between the surfaces of the die assembly and the film of the coil.

On the contrary, causing the surfaces of the die assembly subjected to the surface treatments with the low friction coefficient results in a capability of achieving a reduction in friction between the surfaces of the die assembly and the film of the coil. This prevents the occurrence of damage to the film of the coil.

With the coil forming die assembly for carrying out the method of forming the coil of the eighth to thirteenth aspects of the present invention, the surface materials may preferably have surfaces subjected to surface treatments each providing a low friction coefficient.

If bending work is conducted on the coil with the film of the coil being kept in direct contact with surfaces of the die assembly, there is a risk of the occurrence of causing the film to be damaged due to a friction between the surfaces of the die assembly and the film of the coil.

On the contrary, causing the surfaces of the die assembly subjected to the surface treatments with the low friction coefficient results in a capability of achieving a reduction in friction between the surfaces of the die assembly and the film of the coil. This prevents the occurrence of damage to the film of the coil.

A still further aspect of the present invention provides a coil manufactured by the methods of forming the coil recited in any one of the first to sixth aspects of the present invention upon using the coil forming die assembly recited in any one of the seventh to fourteenth aspects of the present invention.

With the still further aspect of the present invention, it becomes possible to minimize a reduction in film thickness and damage to the film while realizing increased lamination factor, making it possible to obtain a coil with high quality.

According to a still further aspect of the present invention, there is provided a method of forming a coil, the method comprising: preparing the coil made of a conductive raw material formed in a rectangular shape in cross section and having an outer circumference covered with a film, which has a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film; conducting preliminary forming work on an intermediate portion of the coil with the coil remaining under a linear state; and conducting bending work on the intermediate portion of the coil in a direction perpendicular to the widthwise direction of the coil so as to allow the coil to have a rounded corner portion formed at the intermediate portion. The preliminary forming work includes compressing the intermediate portion of the coil such that the intermediate portion of the coil is formed in a trapezoidal shape with the inside body portion having a less cross-sectional area than that of the outside body portion.

According to a still further aspect of the present invention, there is provided a method of forming a coil, the method comprising: preparing the coil made of a conductive raw material formed in a rectangular shape in cross section and having an outer circumference covered with a film, which has a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film; conducting preliminary forming work on an intermediate portion of the coil with the coil remaining under a linear state; and conducting bending work on the intermediate portion of the coil in a direction perpendicular to the widthwise direction of the coil so as to allow the coil to have a rounded corner portion formed at the intermediate portion. The preliminary forming work includes shaping the intermediate portion of the coil such that the intermediate portion of the coil is formed in a trapezoidal shape with the inside body portion having a less cross-sectional area than that of the outside body portion.

According to a still further aspect of the present invention, there is provided a method of forming a coil, the method comprising: preparing the coil made of a conductive raw material formed in a rectangular shape in cross section and having an outer circumference covered with a film, which has a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film; conducting preliminary forming work on an intermediate portion of the coil with the coil remaining under a linear state; and conducting bending work on the intermediate portion of the coil in a direction perpendicular to the widthwise direction of the coil so as to allow the coil to have a rounded corner portion formed at the intermediate portion. The preliminary forming work includes shaping the intermediate portion of the coil such that the intermediate portion of the coil is formed in a trapezoidal shape with the outside circumferential wall of the coil having a greater thickness than that of the inside circumferential wall of the coil.

According to a still further aspect of the present invention, there is provided a method of forming a coil, the method comprising: preparing the coil made of a conductive raw material formed in a rectangular shape in cross section and having an outer circumference covered with a film, which has a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film; conducting preliminary forming work on an intermediate portion of the coil with the coil remaining under a linear state; and conducting bending work on the intermediate portion of the coil in a direction perpendicular to the widthwise direction of the coil so as to allow the coil to have a rounded corner portion formed at the intermediate portion. The preliminary forming work includes shaping the intermediate portion of the coil such that the intermediate portion of the coil is formed in a trapezoidal shape with the outside circumferential wall of the coil being formed in an outwardly convexed shape.

According to a still further aspect of the present invention, there is provided a method of forming a coil, the method comprising: preparing the coil made of a conductive raw material formed in a rectangular shape in cross section and having an outer circumference covered with a film, which has a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film; conducting preliminary forming work on an intermediate portion of the coil with the coil remaining under a linear state; and conducting bending work on the intermediate portion of the coil in a direction perpendicular to the widthwise direction of the coil so as to allow the coil to have a rounded corner portion formed at the intermediate portion. The preliminary forming work includes shaping the intermediate portion of the coil such that the intermediate portion of the coil is formed in a trapezoidal shape with the inside circumferential wall of the coil being formed in an inwardly concaved shape.

BRIEF DESCRIPTION OF THE DRAWINGS

These and other features and advantages of the present invention will become more apparent in light of the following description, as illustrated in the accompanying drawings, in which.

DETAILED DESCRIPTION OF PREFERRED EMBODIMENTS

Now, coil forming methods and coil forming die assemblies of various embodiments according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, it is to be understood that such terms as "inside", "outside", "inner", "outer", "outward", "downward", "leftward", "widthwise" and the like are words of convenience and are not to be construed as limiting terms.

Coil forming methods, coil forming dies and related coils of various embodiments according to the present invention will be described below in detail with reference to the accompanying drawings.

First Embodiment

A coil forming method of a first embodiment according to the present invention is described below with reference to FIGS. 1A and 1B.

Figure 1A:
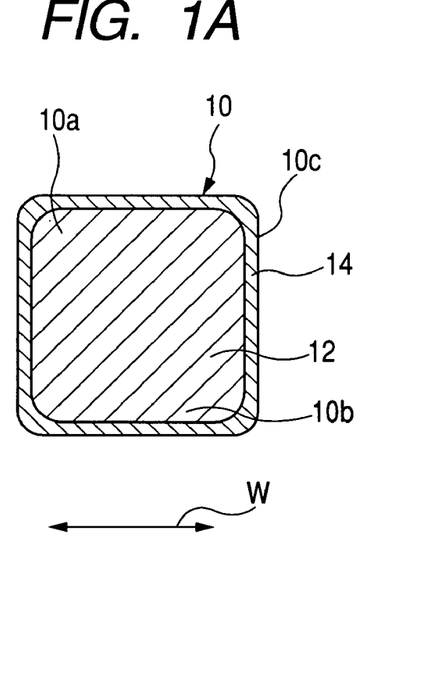
FIG. 1A is a cross-sectional view showing a coil prior to the execution of preliminary forming work thereon.
Figure 1B:
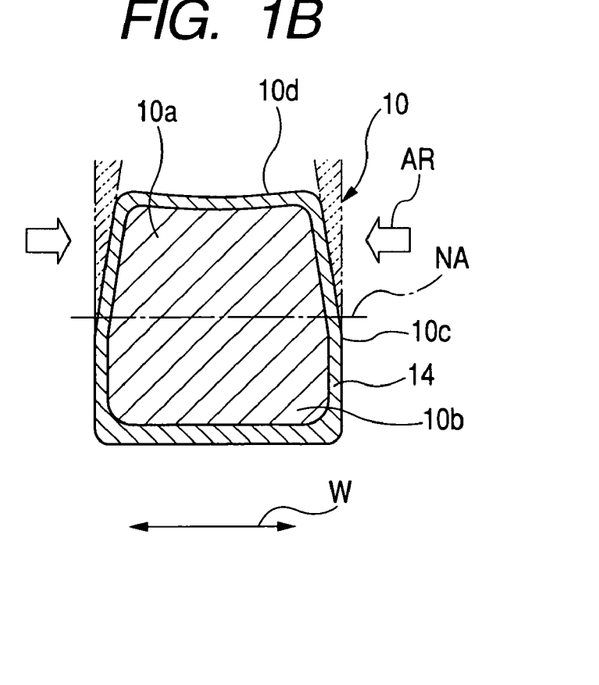
FIG. 1B is a cross-sectional view of the coil subjected to preliminary forming work according to a coil forming method of a first embodiment according to the present invention.

FIG. 1A is a cross-sectional view of a coil 10 before preliminary forming work is conducted on the coil forming method of the present embodiment and FIG. 1B is a cross-sectional view of the coil 100 after preliminary forming work is carried out.

With the present embodiment, the coil forming method includes preparing the coil 10 used for, for instance, a stator or a rotor of an electric rotary machine, conducting preliminary forming work on the coil 10 and subsequently performing bending work on the coil 10. This coil forming method can be applied to the coil 10 when forming an end portion of the coil 10.

As shown in FIGS. 1A and 1B, the coil 10 is comprised of a conductive raw material 12, having a rectangular shape in cross section, and an insulating film 14 covered on an overall surface of the conductive raw material 12. The coil 10 has an inside body portion 10a, an outside body portion 10b and sidewall portions 10c contiguous with both ends of the inside body portion 10a and both ends of the outside body portion 10b. A neutral axis NA (indicated by a single dot line in FIG. 51B) is present between the inside body portion 10a and the outside body portion 10b.

Figure 2:
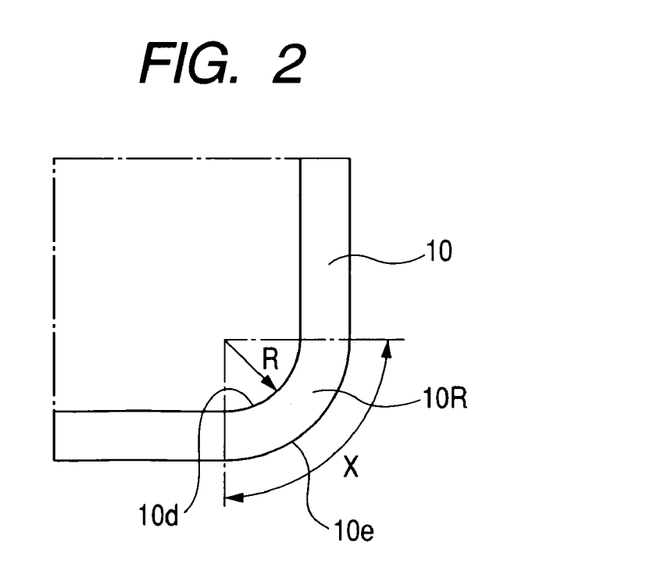
FIG. 2 is a side view showing the coil on which bending work is conducted to cause the coil to be bent at 90 degrees.

The coil 10 of such a structure is subjected to preliminary forming work before bending work is conducted. As shown in FIG. 2, the coil 10 is bent at an angle of 90 degrees with a radius R. Thus, the coil 10 has nearly rounded corner portions 10R, i.e., curved corner sections (each hereinafter referred to as an R-portion), only one of which is shown in FIG. 2. The coil forming method of the present embodiment includes conducting given preliminary forming on the coil 10 prior to performing the bending step thereon.

The preliminary forming work is to perform compression work. Compression work is conducted on tire coil 10, remaining in a linear state, before the bending step is conducted. Compression work is conducted on the coil 10 in a bending area covering a range (i.e., a range indicated by X in FIG. 2) at the nearly R-portion that would be formed when the bending step has been conducted. This allows the inside body portion 10a of the coil 10 to be compressed inward as indicated by arrows AR in the widthwise direction W (i.e., a lateral direction in FIG. 1B), perpendicular to a direction in which the coil 10 is bent in the bending step. When this takes place, upper half areas of the sidewalls 10c are tapered toward an inside circumferential wall 10d of the coil 10 accompanied by a reduction in width of the coil 10 at the inside body portion 10a thereof in the widthwise direction W.

If bending work is directly conducted on the coil 10 with no preliminary forming work being carried out, then the inside body portion 10a of the coil 10, placed in an area inward of the neutral axis NA in FIG. 1B, is caused to bulge in the widthwise direction W at a root portion (i.e., an inward area) of the R-portion 10R. To address such an issue, the present embodiment contemplates to conduct preliminary forming work (compression work) on the coil 10 to compress the inside body portion 10a of the coil 10 inward in the widthwise direction W. This results in a reduction in width of the inside body portion 10a of the coil 10. During such preliminary forming work, the inside body portion 10a of the coil 10, placed in the area inward of the neutral axis NA, is compressed to have a given contour reduced in the nearly same dimension and shape as those of the inside body portion 10a being bulged that would occur when bending work is subsequently conducted on the coil 10 with no preliminary forming work being performed.

With the coil forming method of the present embodiment set forth above, bending work is conducted on the coil 10 with the coil 10 being subjected to preliminary compression work to reduce the widthwise dimension of the inside body portion 10a of the coil 10. This minimizes the bulging (especially the bulging at the inside root portion of the R-portion 10R) of the conductive raw material 12 that would occur during bending work. As a result, no risk occurs for the conductive raw material 12 to vary in shape at an increasing rate due to bending work conducted on the coil 10. Therefore, the coil 10 can maintain the nearly rectangular cross-sectional shape, thereby suppressing a drop in a lamination factor.

Further, no need arises for compressing work to be conducted, as required in the related art coil forming method, for correcting the bulging of the inside root portion of the coil 10 at the R-portion thereof. Thus, no risk takes place for the coil 10 to have the insulating film 14 distorted due to compression work conducted for correcting the bulging of the inside root portion of the coil 10. Therefore, the insulating film 14 is not reduced in thickness, thereby ensuring the coil 10 to be electrically insulated from a neighboring coil 10.

Second Embodiment

A coil forming method of a second embodiment according to the present invention is described below with reference to FIGS. 3A and 3B.

Figure 3A:
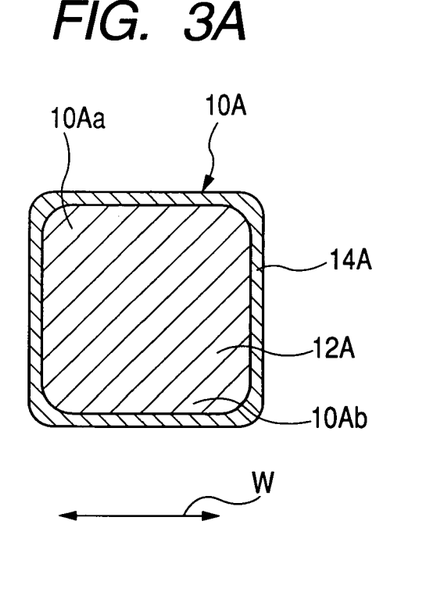
FIG. 3A is a cross-sectional view showing another coil prior to the execution of preliminary forming work.
Figure 3B:
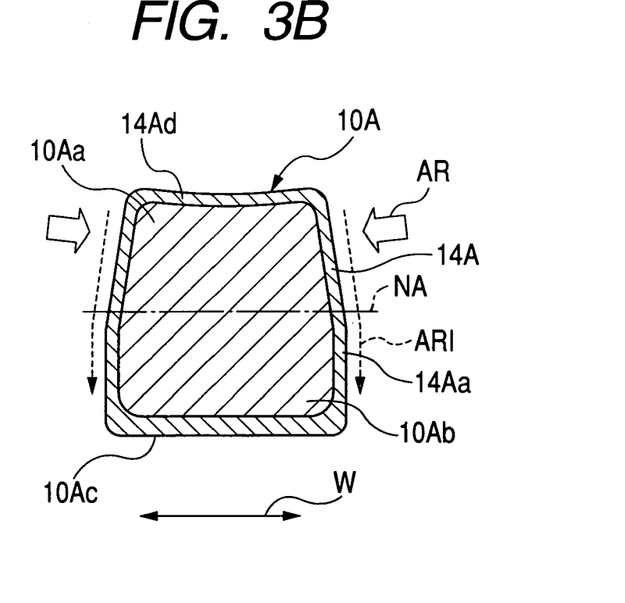
FIG. 3B is a cross-sectional view showing the coil, shown in FIG. 3A, which is subjected to preliminary forming work according to a coil forming method of a second embodiment according to the present invention.

FIG. 3A is a cross-sectional view of a coil 10A before preliminary forming work is conducted according to the coil forming method of the present embodiment and FIG. 3B is a cross-sectional view of the coil 10A after preliminary forming work is carried out.

With the second embodiment, like the first embodiment, the coil forming method includes given preliminary forming work to be conducted before the coil 10A is subjected to bending work. In preliminary forming work, compression work is conducted on the coil 10A, remained in a linear shape prior to bending work being conducted, in the widthwise direction W to compress the coil 10A at an area covering a nearly R-portion appearing subsequent to bending work. When subjected to compression work, the coil 10A is deformed into a given contour in cross section with an inside body portion 10Aa being compressed. This causes an inward portion of the insulating film 14A and the inside body portion 10Aa to be partially transferred to an outward portion of the insulating film 14A and an outside body portion 10Ab. This decreases a lateral width of the inside body portion 10Aa of the coil 10A at an R-portion thereof.

If bending work is directly conducted on the coil 10A with no preliminary forming work being carried out, the outside body portion 10Ab of the coil 10A, placed in an area outside of the neutral axis NA of the coil 10A at the R-portion, has both sides caused to stretch in deformation in the widthwise direction W with a resultant increase in width of an outer circumferential surface 10Ac of the coil 10A at the R-portion. This results in a reduction in thickness of the insulating film 14A.

Meanwhile, a compressive deformation occurs on an inner circumferential surface 10Ad of the coil 10A at tire R-portion and on both sides thereof at a position inward of the neutral axis NA of the coil 10A, resulting in an increase in thickness of the insulating film 14A. To address such an issue, preliminary forming work (compression work) is conducted on the coil 10A as shown in FIG. 3B. This causes the inside body portion 10Aa of the coil 10A to be compressed inward in the widthwise direction W. When this takes place, the insulating film 14A, placed on both sides of the coil 10A in an area inward of the neutral axis NA, and a neighboring inside body portion 10Aa of the coil 10A are transferred to the coil 10A at an area outside the neutral axis NA. Then, bending work is conducted on the coil 10A. This minimizes a reduction in thickness of the insulating film 14A of the coil 10A in the area outside of the neutral axis NA. That is, this prevents the occurrence of a reduction in thickness of the insulating film 14A at the outer circumferential surface 10Ac and a reduction in thickness of the insulating film 14A on both sidewall portions 14Aa of the coil 14A.

Third Embodiment

A coil forming method of a third embodiment according to the present invention is described below with reference to FIGS. 4A and 4B.

Figure 4A:
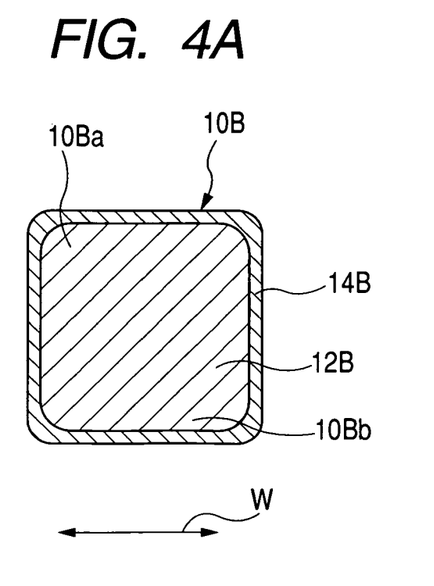
FIG. 4A is a cross-sectional view showing another coil prior to the execution of preliminary forming work.
Figure 4B:
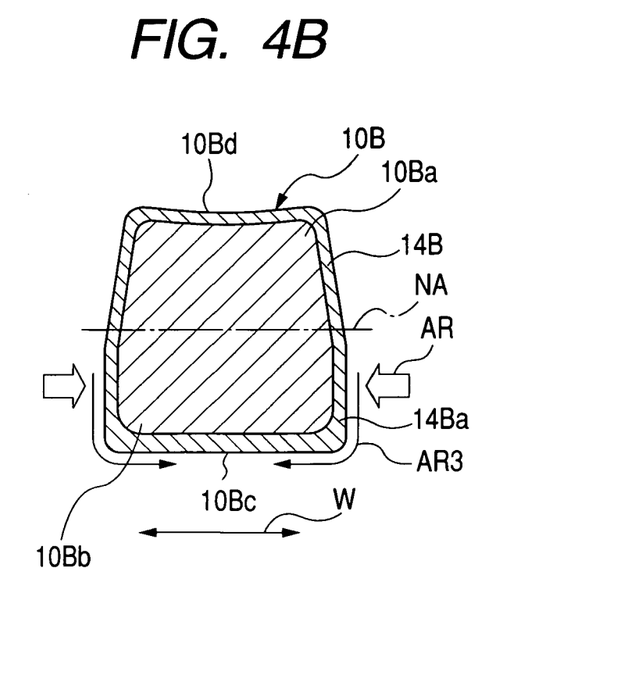
FIG. 4B is a cross-sectional view showing the coil, shown in FIG. 4A, which is subjected to preliminary forming work according to a coil forming method of a third embodiment according to the present invention.

FIG. 4A is a cross-sectional view of a coil 10B before preliminary forming work is conducted according to the coil forming method of the present embodiment and FIG. 4B is a cross-sectional view of the coil 10B after preliminary forming work is carried out.

With the third embodiment, like the first embodiment, given preliminary forming work is conducted before the coil 10B is subjected to bending work. In preliminary forming work, compression work is conducted on the coil 10B, remained in a linear shape prior to bending work, in an area covering a rounded corner portion (see FIG. 2) to be formed by subsequent bending work. In particular, compression work is conducted to compress the coil 10B as indicated by arrows AR2 in FIG. 4B such that an insulating film 14Ba, placed in the vicinity of an outside body portion 10Bb of the coil 10B on both sides thereof, and the outside body portion 10Bb are transferred to an outside area of the coil 10B in a position closer to an outer circumferential surface 10Bc.

On an outer circumferential periphery of the coil 10B at the rounded corner portion thereof placed in an area outside of the neutral axis NA, a stretching deformation occurring on bending sidewalls of the coil 10B is minimized at an area near the neutral axis NA and a maximum stretching deformation occurs on the outer circumferential surface 10Bc of the coil 10B. Accordingly, a reduction in thickness of the insulating film 14B at the outside circumferential wall 10Bc has a minimum rate. The insulating film 14Ba on both sides of the outside body portion 10Bb, subjected to relatively lessened reduction in film thickness, and the neighboring outside body portion 10Bb are transferred to outside areas of the coil 10B in positions near the outer circumferential surface 10Bc. This minimizes a reduction in thickness of the insulating film 14B at the outer circumferential surface 10Bc of the coil 10B.

Fourth Embodiment

A coil forming method of a fourth embodiment according to the present invention is described below with reference to FIGS. 5A and 5B.

Figure 5A:
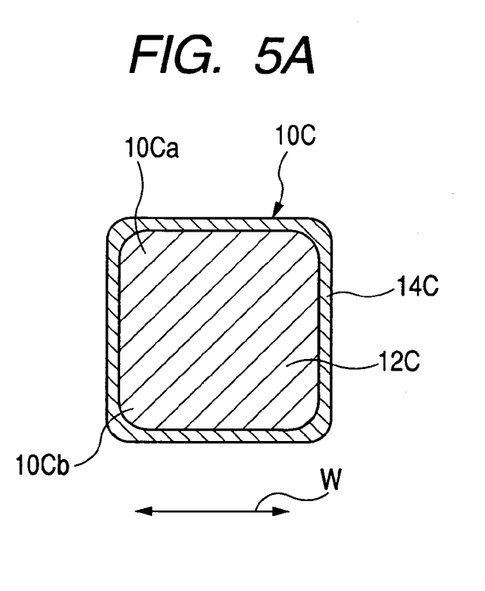
FIG. 5A is a cross-sectional view showing another coil prior to the execution of preliminary forming work thereon.
Figure 5B:
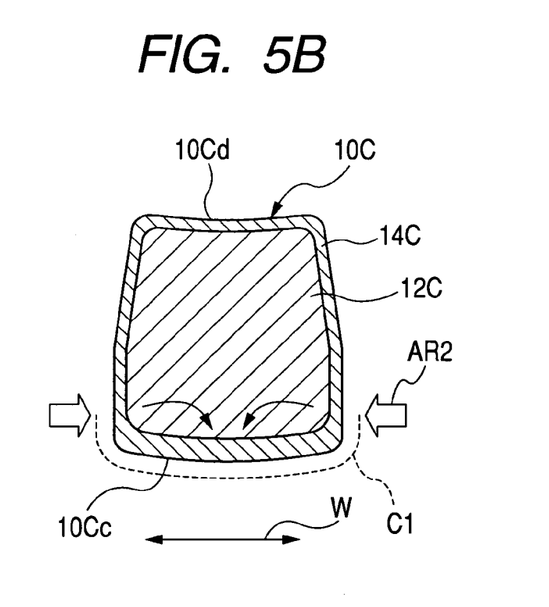
FIG. 5B is a cross-sectional view showing the coil, shown in FIG. 3A, which is subjected to preliminary forming work according to a coil forming method of a fourth embodiment according to the present invention.

FIG. 5A is a cross-sectional view of a coil 10C before preliminary forming work is conducted in the coil forming method of the present embodiment and FIG. 5B is a cross-sectional view of the coil 10C after preliminary forming work is carried out.

With the fourth embodiment, like the first embodiment, given preliminary forming work is conducted on the coil 10C before bending work is conducted on the coil 10C. The preliminary forming work includes a convex forming step that is conducted on the coil 10C, remained in a linear shape as shown in FIG. 5A prior to the execution of bending work, in an area covering a rounded corner portion of the coil 10C to be formed by subsequent bending work. As shown in FIG. 5B, conducting the convex forming step on the coil 10C causes a central area of an outer circumferential surface 10Cc of the coil 10C to bulge by a given amount at a rounded corner portion of the coil 10C in the widthwise direction W.

The convex forming step is to cause the outer circumferential surface 10Cc of the coil 10C to bulge at the rounded corner portion by the nearly same dimension as that of the outer circumferential surface 10Cc that would bulge when bending work is conducted on the coil 10C with no preliminary forming work being carried out.

If bending work is conducted on the coil 10C with no execution of preliminary forming work, the coil 10C is concaved at a central area of the outer circumferential surface 10Cc of the rounded corner portion 10R (see FIG. 2), resulting in the formation of a so-called saddle-like contour. In this case, the outer circumferential surface 10Cc on both end portions thereof has larger heights than that of the central area in the widthwise direction W. This results in a risk of the occurrence of causing an interference with an adjacent coil 10C or a laminated core sheet of an iron core, causing a drop in lamination factor.

In contrast, executing preliminary forming work (convex forming step) on the coil 10C to allow the central area of the outer circumferential surface 10Cc to bulge by a given rate and subsequently conducting bending work on the coil 10C enables a reduction in the rate of indent caused at the outer circumferential surface 10Cc of the coil 10C. In other word, executing preliminary forming work on the coil 10C before conducting bending work enables the outer circumferential surface 10Cc to be formed in a nearly flattened surface, thereby enabling an increase in lamination factor of the coil 10C.

Fifth Embodiment

A coil forming method of a fifth embodiment according to the present invention is described below with reference to FIGS. 6A and 6B.

Figure 6A:
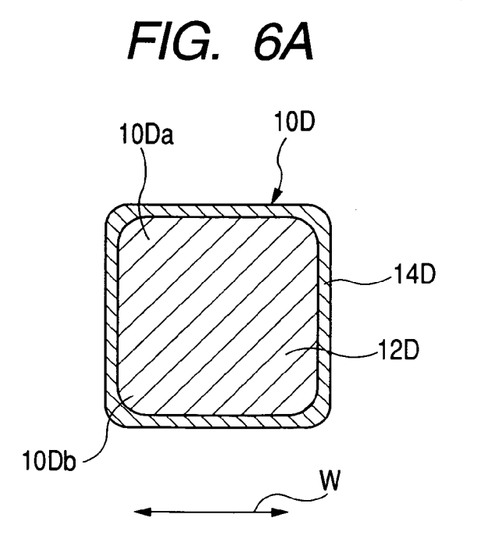
FIG. 6A is a cross-sectional view showing another coil prior to the execution of preliminary forming work thereon.
Figure 6B:
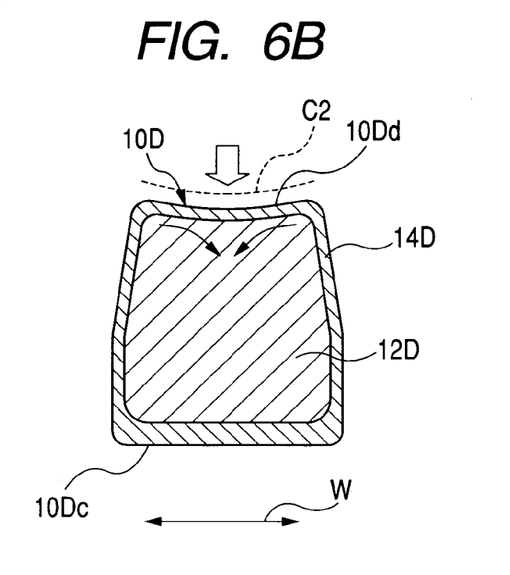
FIG. 6B is a cross-sectional view showing the coil, shown in FIG. 4A, which is subjected to preliminary forming work according to a coil forming method of a fifth embodiment according to the present invention.

FIG. 6A is a cross-sectional view of a coil 10D before preliminary forming work is conducted in the coil forming method of the present embodiment and FIG. 6B is a cross-sectional view of the coil 10D after preliminary forming work is carried out.

With the fifth embodiment, like the first embodiment, given preliminary forming work is conducted before bending work is conducted on the coil 10D. In preliminary forming work, a concave forming step is conducted on the coil 10D, remained in a linear shape prior to the execution of bending work, at a rounded corner portion thereof to be formed during bending work. As shown in FIG. 6B, conducting the concave forming step on the coil 10D to concave an inner circumferential surface 10Dd of the coil 10D the rounded corner portion (see FIG. 2) at a central area thereof in the widthwise direction W by a given amount along a curved line C2.

The concave forming step is to cause the inner circumferential surface 10Dd of the coil 10D to be concaved by the nearly same dimension as that of tire inner circumferential surface 10Dd that would be concaved when bending work is conducted on the coil 10D with no preliminary forming work being carried out.

If bending work is conducted on the coil 10D with no execution of preliminary forming work, a central area of the inner circumferential surface 10Dd of the coil 10D at the rounded corner portion (see FIG. 2) is caused to bulge with respect to both end portions of the coil 10D in the widthwise direction W. In this case, a central area of the inner circumferential surface 10Dd is larger in height than the both end portions of the coil 10D in the widthwise direction W, causing a risk of causing an interference with an adjacent coil 10D or a laminated core sheet of an iron core with a drop in lamination factor.

In contrast, executing preliminary forming work (concave forming step) on the coil 10D to concave the central area of the inner circumferential surface 10Dd by a given indent amount and subsequently conducting bending work on the coil 10D enables a reduction in the bulging of the inner circumferential surface 10Dd. In other word, executing preliminary forming work before bending work enables the inner circumferential surface 10Dd of the coil 10D to be formed in a nearly flattened surface, thereby enabling an increase in lamination factor.

Sixth Embodiment

A coil forming die assembly of a sixth embodiment according to the present invention for use in forming the coils of the various embodiments described above is described below with reference to FIG. 7 and FIGS. 8A and 8B.

Figure 7:
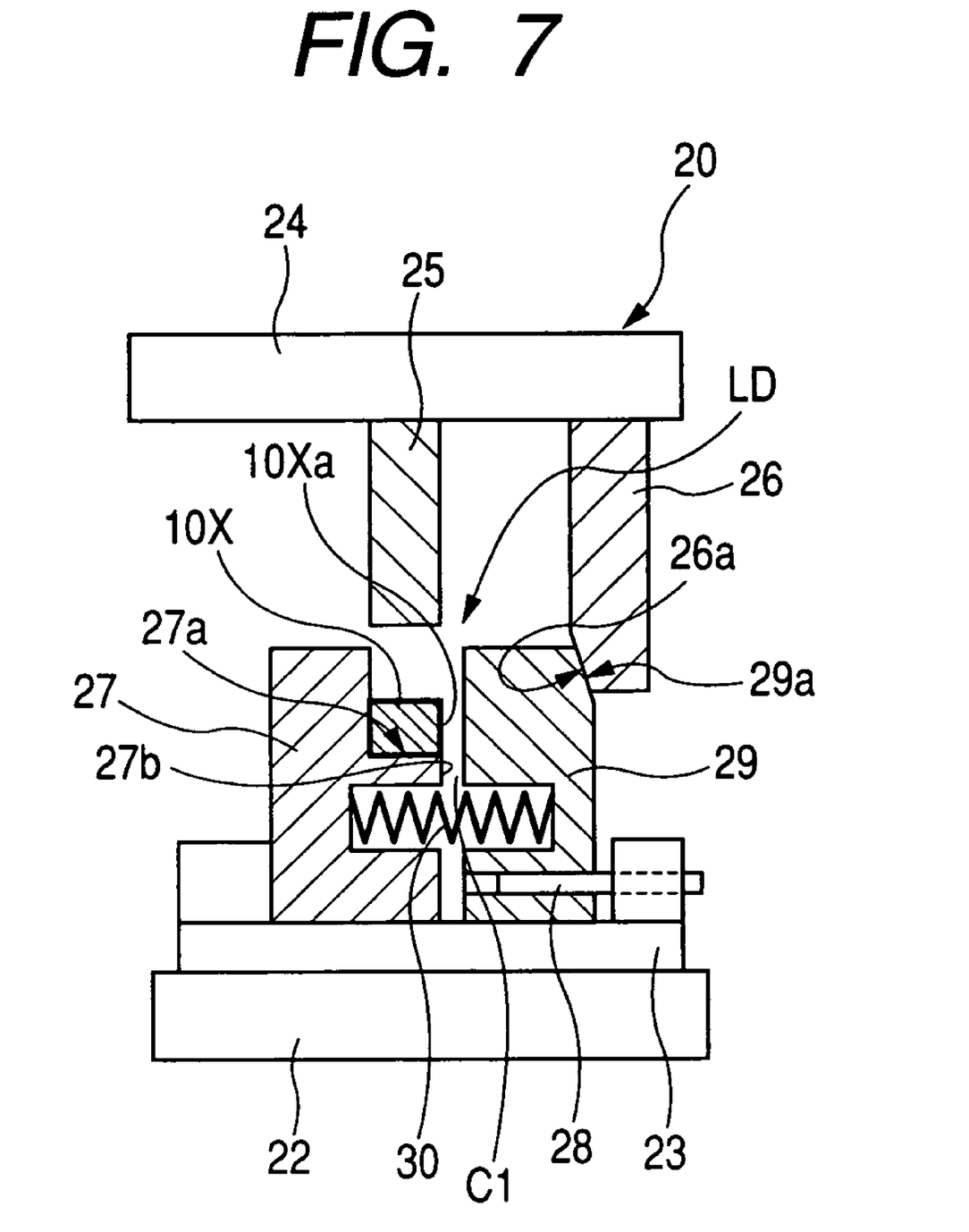
FIG. 7 is a front cross-sectional view of the coil forming die assembly of a sixth embodiment according to the present invention.

FIG. 7 is a front view in cross section of the coil forming die assembly 20 of the present embodiment.

The coil forming die assembly 20 of the present embodiment is used for executing the coil forming methods related to the first to fifth embodiments described above.

As shown in FIG. 7, the coil forming die assembly 20 of the present embodiment includes a bed 23 fixedly mounted on a lower base 22, a lower die (described below in detail) LD placed on the bed 23, and an upper die 25 and a taper die 26 fixedly mounted on an upper base 24 at a bottom wall thereof.

Figure 8A:
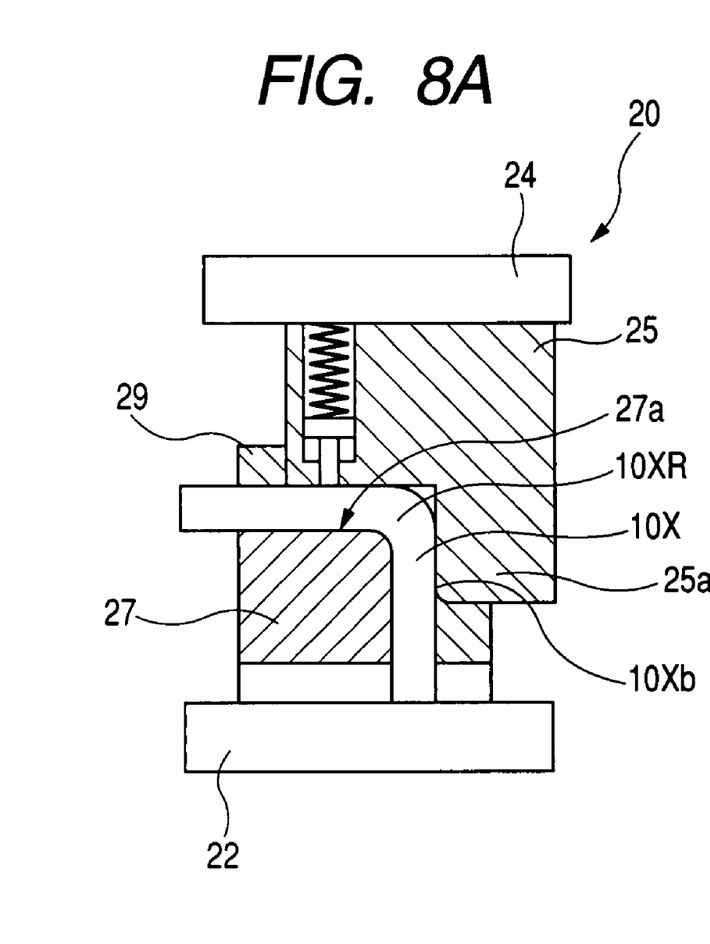
FIG. 8A is a side cross-sectional view of the coil die assembly of a seventh embodiment according to the present invention.

As shown in FIG. 8A, the upper die 25 has a bending die portion 25a having an L-shaped surface in cross section to be brought into abutting engagement with an outer circumferential periphery 10Xb of a coil 10X to be bent at a right angle when the upper die 25 is moved downward in a manner as described below.

The lower die LD is divided in two halves and includes a first sidewall member 27 fixedly secured to the bed 3, a second sidewall member 9 guided with a guide bar 8 mounted on the bed 23 to be slidably movable on the bed 23, and a spring 30 interposed between the first and second sidewall members 27 and 29.

The first sidewall member 27 has a coil mounting wall 27a, having an L-shape in cross section, on which a linear-shaped coil 10X (corresponding to the coils 10 to 10D each on a stage before bending work is conducted) is set.

The second sidewall member 9 rests on the bed 23 at a position spaced from the first sidewall member 27 by a given distance upon receipt of a load of the spring 10 (see FIG. 7). Moving the second sidewall member 29 toward the first sidewall member 27 against the load of the spring 30 allows a holding surface 29a of the second sidewall member 29 to be brought into tight contact with a sidewall surface 27b of the first sidewall member 27. When this takes place, the holding surface 29a of the second sidewall member 29 is brought into tight contact with a sidewall 10Xa of the coil 10X, which is consequently set on the coil mounting surface 27a. In addition, the second sidewall member 29 is moved backward away from the first sidewall member 27 due to the load of the spring 30 when setting the coil 10X onto the coil mounting wall 27a and when taking the coil 10X from the coil mounting wall 27a. This allows a clearance Cl to be created on an open side of the coil mounting wall 27a.

The upper die 25 extends downward from the upper base 24 in an L-shaped configuration with respect to a linear direction of the coil 10X to perform bending work on the coil 10X set on the coil mounting surface 27a.

The taper die 26 has a lower end formed with an inwardly facing tapered surface 26a available to be brought into abutting engagement with an outwardly facing inclined surface 29a formed on the second sidewall member 29 at an upper shoulder portion thereof. During downward movement of the upper base 24, the tapered surface 26a laterally pushes the inclined surface 9a of the second sidewall member 29 leftward in FIG. 7, thereby moving the second sidewall member 29 toward the first sidewall member 27.

Figure 8B:
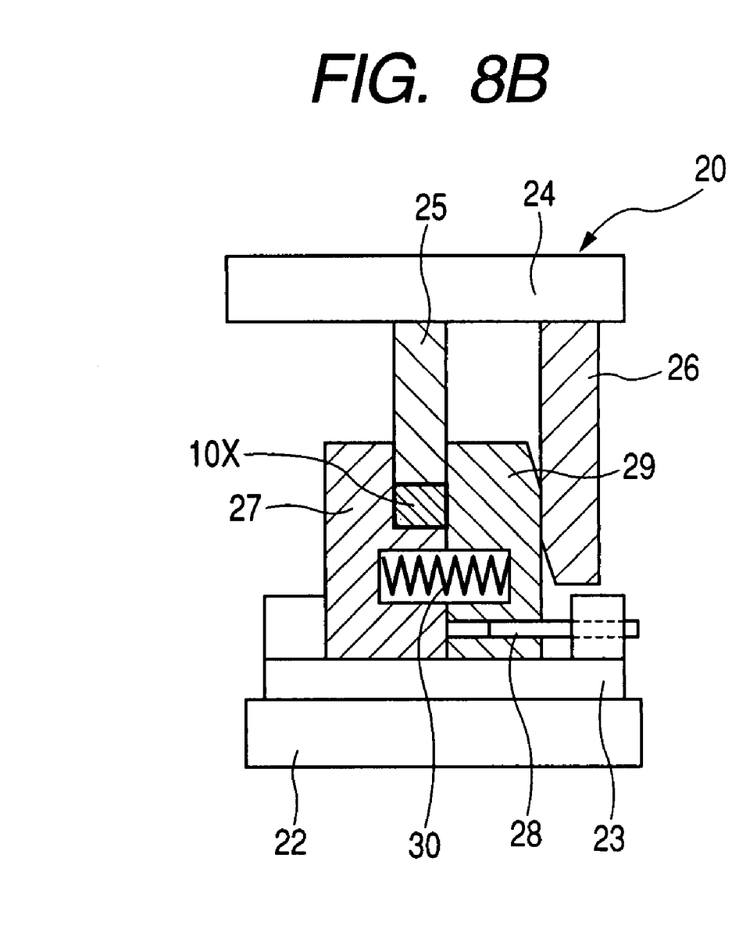
FIG. 8B is a front cross-sectional view of the coil die assembly of the seventh embodiment shown in FIG. 5A.

As shown in FIG. 7, with the coil forming die assembly, the upper base 24 is caused to move downward after the linear coil 10X is set onto tire coil mounting surface 27a of the first sidewall member 27. As shown in FIG. 8B, when the taper die 26 pushes the second sidewall member 29, the second sidewall member 29 moves leftward against the load of the spring 30 until the second sidewall member 29 is brought into tight contact with the sidewall surface 27b of the first sidewall member 27 to hold the coil 10X in place. As shown in FIG. 8A, subsequently, the upper die 25 is moved downward to cause the bending die portion to be brought into abutting engagement with the outer circumferential periphery 10Xb of the coil 10X, which is consequently bent at an angle of 90 degrees accompanied by the formation of an R-portion 10XR.

With the coil forming die assembly of the present embodiment, when taking the coil 10X, subjected to bending work, from the coil mounting surface 27a, the second sidewall member 27 is moved away from the first sidewall member 27. This allows the clearance Cl to be created on an open side of the coil mounting surface 27a (see FIG. 7). Therefore, no risk occurs for the both sidewalls of the coil 10X to bite the first and second sidewall members 27 and 29. This prevents the occurrence of defect in deformation of the coil 10X and no damage occurs to the insulating film of the coil 10X. In addition, using the coil forming die assembly of the present embodiment to perform bending work on the coil 10X employing any one of the coil forming methods described with reference to the first to fifth embodiments enables the suppression of a reduction in film thickness while enabling the realization of an increased lamination factor.

Seventh Embodiment

A coil forming die assembly of a seventh embodiment according to the present invention is described below with reference to FIG. 9.

Figure 9:
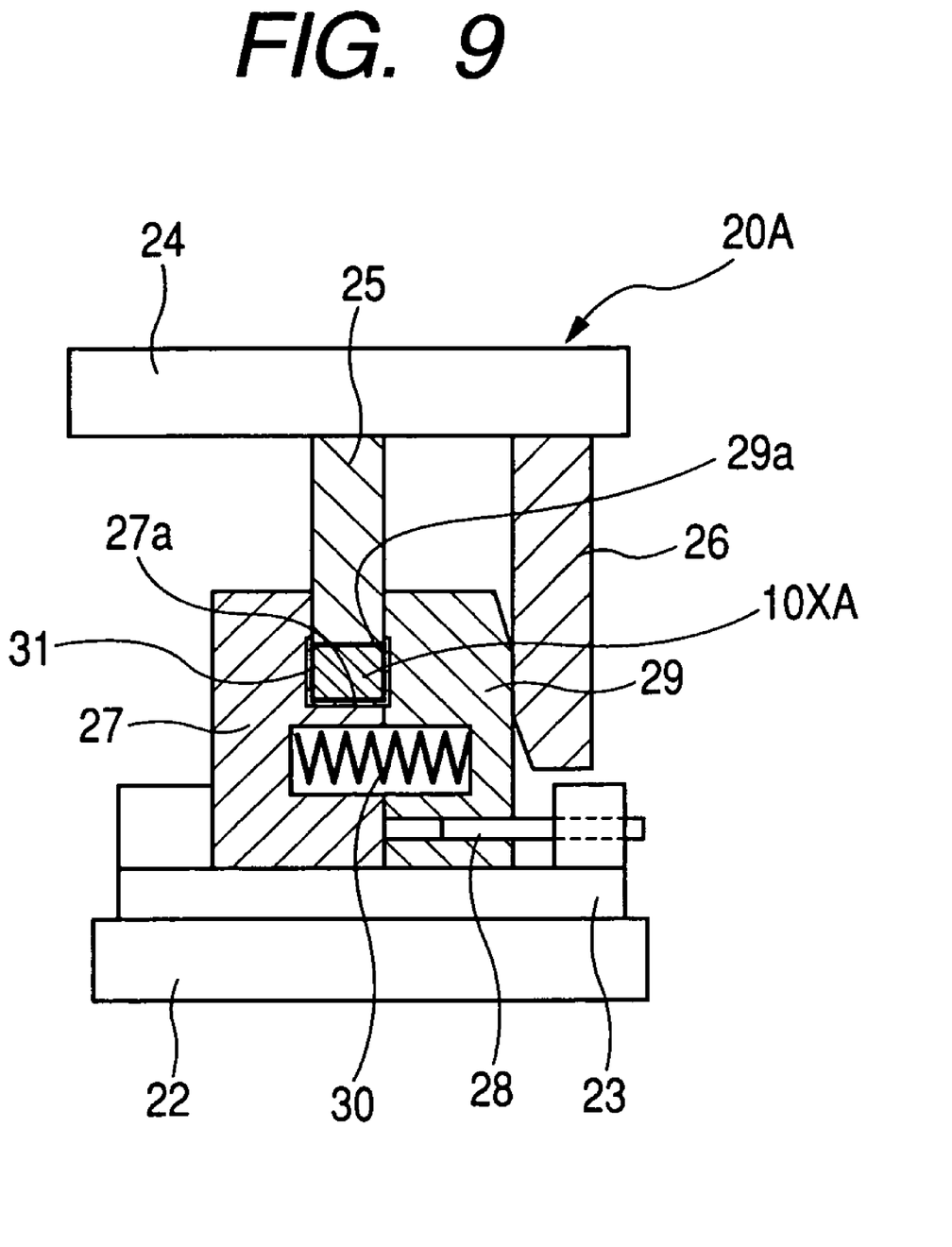
FIG. 9 is a front cross-sectional view of a coil forming die assembly of a seventh embodiment according to the present invention.

FIG. 9 is a front view in cross section of the coil forming die assembly of the present embodiment.

The coil forming die assembly 20A of the present embodiment differs from the coil forming die assembly 20 of the sixth embodiment in that, as shown in FIG. 9, the coil mounting surface 27a of the first sidewall member 27 and the holding surface 29a of the second sidewall member 29 are provided with a surface material 31 made of material (such as, for instance, aluminum or rubber or the like) having lower hardness or lower elastic coefficient than those of metallic material (such as, for instance, steel material) used for the first and second sidewall members 27 and 29.

If bending work is conducted with the insulating film of the coil 10X held in direct contact with the surfaces of the first and second sidewall members 7 and 9, the surfaces of the first and second sidewall members 7 and 9 are brought into contact with the insulating film of the coil 10X at localized areas. Thus, an increased surface pressure is applied to the insulating film of the coil 10X, causing a risk of damage occurring to the insulating film of the coil 10X.

In contrast, providing the surface material 31 on the surfaces of the first and second sidewall members 27 and 29 prevents the insulating film of the coil 10X from being brought into direct contact with the surfaces of the first and second sidewall members 27 and 29. This enables bending work to be conducted on the coil 10X with the insulating film thereof held in contact with the surface material 31 with lowered hardness or elastic coefficient. This prevents damage to the insulating film of the coil 10X during bending work.

(Modified Form)

More than two coil forming methods described above with reference to the first and fifth embodiments can be conducted in combination.

In this case, a reduction in film thickness can be minimized to a lower level than that achieved when executing any single one of the coil forming methods described above with reference to the first and fifth embodiments in a single attempt, while achieving an increase in lamination factor of the coil 10X.

With the coil forming die assembly, further, the coil mounting surface 27a of the first sidewall member 27 and the surface 29a, facing the open side of the soil mounting surface 27a, of the second sidewall member 29 may be subjected to surface treatment to form surfaces with lowered friction coefficient. If bending work is conducted on the coil 10X with the insulating film kept in direct contact with the surfaces of the first and second sidewall members 27 and 29, there is a risk of damage occurring to the insulating film of the coil 10X due to a friction between the surfaces of the first and second sidewall members 27 and 29 and the insulating film of the coil 10X.

On the contrary, causing the first and second sidewall members 27 and 29 to be subjected to surface treatments with low friction coefficient enables a reduction in friction between the surfaces of the first and second sidewall members 27 and 29 and the insulating film of the coil 10X during bending work, thereby minimizing damage to the insulating coil of the coil 10X. Further, for surface treatment with low friction coefficient, various processing may be employed including, for instance, Teflon (Trademark of polytetrafluoroethylene) treatment, a DLC (diamond-like carbon) treatment or the like. Moreover, the surface material 31 (such as, for instance, aluminum), described with reference to the seventh embodiment, may have a surface subjected to surface treatment with low friction coefficient.

In addition, while the first embodiment has been described above with reference to the present invention applied to the coil 10 for use in the stator or the rotor of the electric rotary machine, the coil forming methods and the coil forming die assemblies of the present invention can be also applied to a coil (such as, for instance, a booster coil) for use in other applications except for the electric rotary machine.

While the specific embodiments of the present invention have been described in detail, it will be appreciated by those skilled in the art that various other modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A method of forming a coil to be bent in a first direction perpendicular to a second direction along which neighboring coils are disposed, the method comprising:
   preparing the coil made of a conductive raw material formed in a rectangular shape in cross section and having an outer circumference covered with a film, the rectangular shape having first and second linear edge portions, the first edge portion and the second edge portion being perpendicular to each other and sharing a corner portion at each end of the first and second edge portions;
   compressing the coil to decrease a dimension of the coil in the second direction; and
   after the coil is compressed, bending the coil to have the first edge portion rounded in the first direction,
   wherein
   the coil is compressed in a region including the first edge portion and the corner portion thereof to allow the second edge portion to be tapered, and
   the coil is compressed to decrease the dimension of the coil in the second direction by an amount that is substantially the same as an amount that the coil would bulge in the second direction if the bending step was performed without first compressing the coil.

2. A method of forming a coil to be bent in a
first direction perpendicular to a second direction along which neighboring coils are disposed, the method comprising:
   preparing the coil made of a conductive raw material formed in a rectangular shape in cross section and having an outer circumference covered with a film, the rectangular shape having first and second linear edge portions, the first edge portion and the second edge portion being perpendicular to each other and sharing a corner portion at each end of the first and second edge portions, the coil having a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film;
   compressing the coil to allow a dimension of the coil in the second direction to decrease; and
   bending the coil to have the first edge portion rounded in the first direction, after the coil is compressed, wherein
   the coil is compressed to cause a portion adjacent to the second edge portions of the inside body portion and
   the first portion of the film to be transferred to an area away from the neutral axis of the coil.

3. A method of forming a coil to be bent in a first direction perpendicular to a second direction along which neighboring coils are disposed, the method comprising:
   preparing the coil made of a conductive raw material formed in a rectangular shape in cross section and having an outer circumference covered with a film, the rectangular shape having first and second linear edge portions, the first edge portion and the second edge portion being perpendicular to each other and sharing a corner portion at each end of the first and second edge portions, the coil having a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film;

compressing an intermediate portion to be formed in a trapezoidal shape with the inside body portion having a small cross-sectional area than that of the outside body portion; and bending the intermediate portion of the coil in the second direction of the coil so as to allow the coil to have a rounded corner portion formed at the intermediate portion.

4. A method of forming a coil to be bent in a first direction perpendicular to a second direction along which neighboring coils are disposed, the method comprising:

preparing the coil made of a conductive raw material formed in a rectangular shape in cross section and having an outer circumference covered with a film, the rectangular shape having first and second linear edge portions, the first edge portion and the second edge portion being perpendicular to each other and sharing a corner portion at each end of the first and second edge portions, the coil having a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film;

shaping an intermediate portion of the coil to be formed in a trapezoidal shape with the inside body portion having a small cross-sectional area than that of the outside body portion; and bending the intermediate portion of the coil in the second direction of the coil so as to allow the coil to have a rounded corner portion formed at the intermediate portion.

5. A method of forming a coil to be bent in a first direction perpendicular to a second direction along which neighboring coils are disposed, the method comprising:

preparing the coil made of a conductive raw material formed in a rectangular shape in cross section and having an outer circumference covered with a film, the rectangular shape having first and second linear edge portions, the first edge portion and the second edge portion being perpendicular to each other and sharing a corner portion at each end of the first and second edge portions, the coil having a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film;

shaping an intermediate portion of the coil to be formed in a trapezoidal shape with the outside circumferential wall of the coil having a greater thickness than that of the inside circumferential wall of the coil; and bending the intermediate portion of the coil in the second direction of the coil so as to allow the coil to have a rounded corner portion formed at the intermediate portion.

6. A method of forming a coil to be bent in a first direction perpendicular to a second direction along which neighboring coils are disposed, the method comprising:

preparing the coil made of a conductive raw material formed in a rectangular shape in cross section and having an outer circumference covered with a film, the rectangular shape having first and second edge portions of which shape are linear, the first edge portion and the second edge portion being perpendicular to each other and sharing a corner portion at each end of the first and second edge portions, the coil having a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film;

shaping an intermediate portion of the coil to be formed in a trapezoidal shape with the outside circumferential wall of the coil being formed in an outwardly convexed shape; and bending the intermediate portion of the coil in a the second direction of the coil so as to allow the coil to have a rounded corner portion formed at the intermediate portion.

7. A method of forming a coil to be bent in a first direction perpendicular to a second direction along which neighboring coils are disposed, the method comprising:

preparing the coil made of a conductive raw material formed in a rectangular shape in cross section and having an outer circumference covered with a film, the rectangular shape having first and second linear edge portions, the first edge portion and the second edge portion being perpendicular to each other and sharing a corner portion at each end of the first and second edge portions, the coil having a neutral axis aligned near the center of the coil between an inside circumferential wall of the coil and an outside circumferential wall thereof, an inside body portion placed inward of the neutral axis and covered with a first portion of the film, and an outside body portion placed outward of the neutral axis and covered with a second portion of the film;

shaping an intermediate portion of the coil to be formed in a trapezoidal shape with the inside circumferential wall of the coil being formed in an inwardly concaved shape; and bending the intermediate portion of the coil in the second direction of the coil so as to allow the coil to have a rounded corner portion formed at the intermediate portion.

* * * * *